United States Patent
Sun

(10) Patent No.: US 9,210,047 B2
(45) Date of Patent: Dec. 8, 2015

(54) METHOD AND APPARATUS FOR PRESENTING NETWORK PATH

(71) Applicant: Huawei Technologies Co., Ltd., Shenzhen, Guangdong (CN)

(72) Inventor: Tao Sun, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 36 days.

(21) Appl. No.: 14/308,428

(22) Filed: Jun. 18, 2014

(65) Prior Publication Data

US 2014/0301243 A1  Oct. 9, 2014

Related U.S. Application Data

(63) Continuation of application No. PCT/CN2012/081423, filed on Sep. 14, 2012.

(30) Foreign Application Priority Data

Jan. 11, 2012 (CN) .......................... 2012 1 0007016

(51) Int. Cl.
*H04L 12/24* (2006.01)
*H04L 12/46* (2006.01)
(Continued)

(52) U.S. Cl.
CPC ............. *H04L 41/12* (2013.01); *H04L 12/4633* (2013.01); *H04L 12/4641* (2013.01); *H04L 45/02* (2013.01); *H04L 45/50* (2013.01); *H04L 41/044* (2013.01); *H04L 41/22* (2013.01)

(58) Field of Classification Search
CPC ....... H04L 41/044; H04L 41/12; H04L 41/22; H04L 45/02; H04L 45/50; H04L 12/4633; H04L 12/4641

USPC .................................................. 370/254, 256
See application file for complete search history.

(56) References Cited

U.S. PATENT DOCUMENTS 6,181,055 B1    1/2001  Patterson et al.
6,535,490 B1 *  3/2003  Jain .................. H04L 12/462
                                                                    370/254
(Continued)

FOREIGN PATENT DOCUMENTS

CN    1474297 A    2/2004
CN    1780285 A    5/2006
(Continued)

OTHER PUBLICATIONS

Cisco Inc., "Using the Topology Tool", Cisco Prime Fulfillment User Guide 6.1, Aug. 16, 2011, p. 64-1-64-34.
(Continued)

*Primary Examiner* — Afsar M Qureshi

(57) ABSTRACT

Embodiments of the present invention provide a method and an apparatus for presenting a network path. The method includes: querying, according to a first input, VPN service data corresponding to virtual private network VPN service information selected by the first input; presenting a first topology view according to the VPN service data; and presenting a second topology view according to a second input for the first topology view, where the second topology view includes a plurality of different topology layers presenting connection relationships between the network elements. By using the foregoing solutions, a complex activity of a user's manual query is simplified, and a skill requirement imposed on the user is lowered. In this way, the user does not need to memorize association relationships of services. This facilitates fault locating by the user, thereby improving the working efficiency of the user.

16 Claims, 9 Drawing Sheets

(51) Int. Cl.
*H04L 12/751* (2013.01)
*H04L 12/723* (2013.01)

(56) References Cited

U.S. PATENT DOCUMENTS

| | | | |
|---|---|---|---|
| 7,047,496 B2 | 5/2006 | Nelles et al. | |
| 7,623,446 B1 * | 11/2009 | Allan | H04L 1/22 370/223 |
| 7,681,130 B1 | 3/2010 | Lavallee et al. | |
| 7,863,424 B2 | 1/2011 | Dalla-Favera | |
| 7,867,035 B2 | 1/2011 | Binder | |
| 7,873,343 B2 | 1/2011 | Gollnick et al. | |
| 7,886,041 B2 | 2/2011 | Outhred et al. | |
| 7,899,951 B2 | 3/2011 | Mahany et al. | |
| 7,917,145 B2 | 3/2011 | Mahany et al. | |
| 7,923,221 B1 | 4/2011 | Cabilly et al. | |
| 7,958,824 B2 | 6/2011 | Stewart | |
| 7,970,652 B1 | 6/2011 | Woolston | |
| 7,990,908 B2 | 8/2011 | Binder | |
| 8,023,290 B2 | 9/2011 | Schlecht | |
| 2002/0135610 A1 * | 9/2002 | Ootani | G06F 3/0481 715/734 |
| 2008/0219268 A1 | 9/2008 | Dennison | |
| 2009/0077238 A1 * | 3/2009 | Gao | H04L 12/5695 709/226 |
| 2009/0150521 A1 * | 6/2009 | Tripathi | G06F 9/5077 709/220 |
| 2013/0003754 A1 * | 1/2013 | Blumenroether | G08C 19/00 370/431 |
| 2013/0121152 A1 * | 5/2013 | Tanaka | H04L 12/4645 370/235 |
| 2013/0282867 A1 * | 10/2013 | Otake | H04L 12/4641 709/217 |

FOREIGN PATENT DOCUMENTS

| | | | |
|---|---|---|---|
| CN | 101013992 A | 8/2007 | |
| CN | 101060434 A | 10/2007 | |
| CN | 101147348 A | 3/2008 | |
| CN | 101437304 A | 5/2009 | |
| CN | 101442811 A | 5/2009 | |
| CN | 101582793 A | 11/2009 | |
| CN | 101674197 A | 3/2010 | |
| CN | 101686262 A | 3/2010 | |
| CN | 101785257 A | 7/2010 | |
| CN | 101795299 A | 8/2010 | |
| CN | 101969458 A | 2/2011 | |
| CN | 102014403 A | 4/2011 | |
| CN | 102014403 A * | 4/2011 | H04L 41/12 |
| CN | 102025537 A | 4/2011 | |
| CN | 102035672 A | 4/2011 | |
| CN | 102149161 A | 8/2011 | |
| CN | 102571433 A | 7/2012 | |
| EP | 2 124 393 A1 | 11/2009 | |

OTHER PUBLICATIONS

Cisco Inc., "Release Notes for Cisco Prime Fulfillment 6.1", Aug. 16, 2011, 10 pages.

Huawei, "Huawei HQoS Technical White Paper", Aug. 30, 2010, 14 pages.

Cisco Inc., "Cisco Prime Network 3.8 User Guide", Nov. 14, 2011, 54 pages.

* cited by examiner

| File Edit View Performance Configuration Inventory System Window Help |||||||
|---|---|---|---|---|---|---|
| Tunnel Service Management ||||||||
| Service Name | Running Status | Alarm Severity | Deployment Status | Customer | Created By | Time |
| Tunnel1 | UP | Normal | Deployed | Carrier 1 | XXX | 2011-6-5 |
| Tunnel1-reverse | UP | Normal | Deployed | Carrier 1 | XXX | 2011-6-5 |

FIG. 6B

| File Edit View Performance Configuration Inventory System Window Help |||||||
|---|---|---|---|---|---|---|
| Tunnel Service Management ||||||||
| Service Name | Running Status | Alarm Status | Deployment Status | Customer | Created By | Time |
| *Tunnel1* | *UP* | *Normal* | *Deployed* | *Carrier 1* | *XXX* | *2011-6-5* |
| Tunnel1-reverse | UP | Normal | Deployed | Carrier 1 | XXX | 2011-6-5 |
| *Tunnel* ||||||||
| Tunnel segment 1 ||||||||
| LSP link 1 ||||||||
| LSP link 2 ||||||||
| LSP link 3 ||||||||
| Tunnel segment 2 ||||||||
| LSP link 1 ||||||||
| LSP link 2 ||||||||
| LSP link 3 ||||||||
| Tunnel segment 3 ||||||||
| LSP link 1 ||||||||
| LSP link 2 ||||||||

FIG. 6C

| | | | | | | |
|---|---|---|---|---|---|---|
| File Edit View Performance Configuration Inventory System Window Help ⟵ 605 | | | | | | |
| Tunnel Service Management | | | | | | |
| Service Name | Running Status | Alarm Severity | Deployment Status | Customer | Created By | Time |
| *Tunnel1* | *UP* | *Normal* | *Deployed* | *Carrier 1* | *XXX* | *2011-6-5* |
| Tunnel1-reverse | UP | Normal | Deployed | Carrier 1 | XXX | 2011-6-5 |

Tunnel
- Tunnel segment 1  ⟵ 651
- LSP link 1
- LSP link 2
- LSP link 3
- Tunnel segment 2
- LSP link 1
- LSP link 2
- LSP link 3
- Tunnel segment 3
- LSP link 1
- LSP link 2

650

630

A ——— E

660

FIG. 6D

METHOD AND APPARATUS FOR PRESENTING NETWORK PATH

CROSS-REFERENCE TO RELATED APPLICATIONS

This application is a continuation of International Application No. PCT/CN2012/081423, filed on Sep. 14, 2012, which claims priority to Chinese Patent Application No. 201210007016.6, filed on Jan. 11, 2012, both of which are hereby incorporated by reference in their entireties.

TECHNICAL FIELD

The present invention relates to the Internet Protocol (IP, Internet Protocol) field, and in particular, to a method and an apparatus for presenting a network path.

BACKGROUND

With development of communications services, a network size is becoming larger, and network visualized operation and maintenance (O&M, Operation and Maintenance) becomes a main trend in user operation and maintenance. However, at present, regardless of which network operation and maintenance software is used, information acquired by a user from a topology view, of a network management system, for routine operation and maintenance is limited. The topology view presents various paths corresponding to an association relationship. For example, by means of one operation, only a service connection relationship between network elements can be viewed, but routing of a path that carries a service cannot be viewed, for example, an LSP (Label Switch Path, label switched path) connection relationship; or only the LSP connection relationship can be viewed, but the service connection relationship cannot be viewed. Consequently, a great difficulty is caused to a user's clear understanding of a network, and the user fails to have a visual learning of the network. Therefore, the user's working efficiency is low in multiple repeated operations.

SUMMARY

Embodiments of the present invention provide a method for presenting a network path, which can improve the working efficiency of a user.

According to one aspect, a method for presenting a network path is provided, including: querying, according to a first input, VPN service data corresponding to VPN service information selected by the first input, where the first input is used for selecting the VPN service information; presenting a first topology view according to the VPN service data, where the first topology view presents a service connection relationship between network elements; and presenting a second topology view according to a second input for the first topology view, where the presented second topology view includes a plurality of different topology layers presenting connection relationships between the network elements.

According to another aspect, an apparatus for presenting a network path is provided, including: a first querying module, configured to query, according to a first input, VPN service data corresponding to VPN service information selected by the first input, where the first input is used for selecting the VPN service information; a first presenting module, configured to present a first topology view according to the VPN service data acquired by the first querying module, where the first topology view presents a service connection relationship between network elements; and a second presenting module, configured to present a second topology view according to a second input for the first topology view presented by the first presenting module, where the second input is used for presenting the second topology view and the presented second topology view includes a plurality of different topology layers presenting connection relationships between the network elements.

By using the foregoing solutions, a plurality of connection relationships of a network path may be presented in a topology view, so that a complex activity of a user's manual query is simplified, and a skill requirement imposed on the user is lowered. In this way, the user does not need to memorize association relationships of services. In addition, during viewing of the associated paths of the services, relationships between layers of paths of the services can be clearly presented in one interface. This facilitates fault locating by the user, thereby improving the working efficiency of the user.

BRIEF DESCRIPTION OF THE DRAWINGS

FIG. 6A to FIG. 6D are schematic diagrams of related methods for presenting a network path.

DETAILED DESCRIPTION

The following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

In network management software, a user can view only one type of network topology at a time; after a certain object is concerned in a network topology, the concerned information can be viewed by searching another related network topology for the object or by using a redirection portal that is provided. The user must manually establish an association relationship between the two topologies.

Figure 6A:
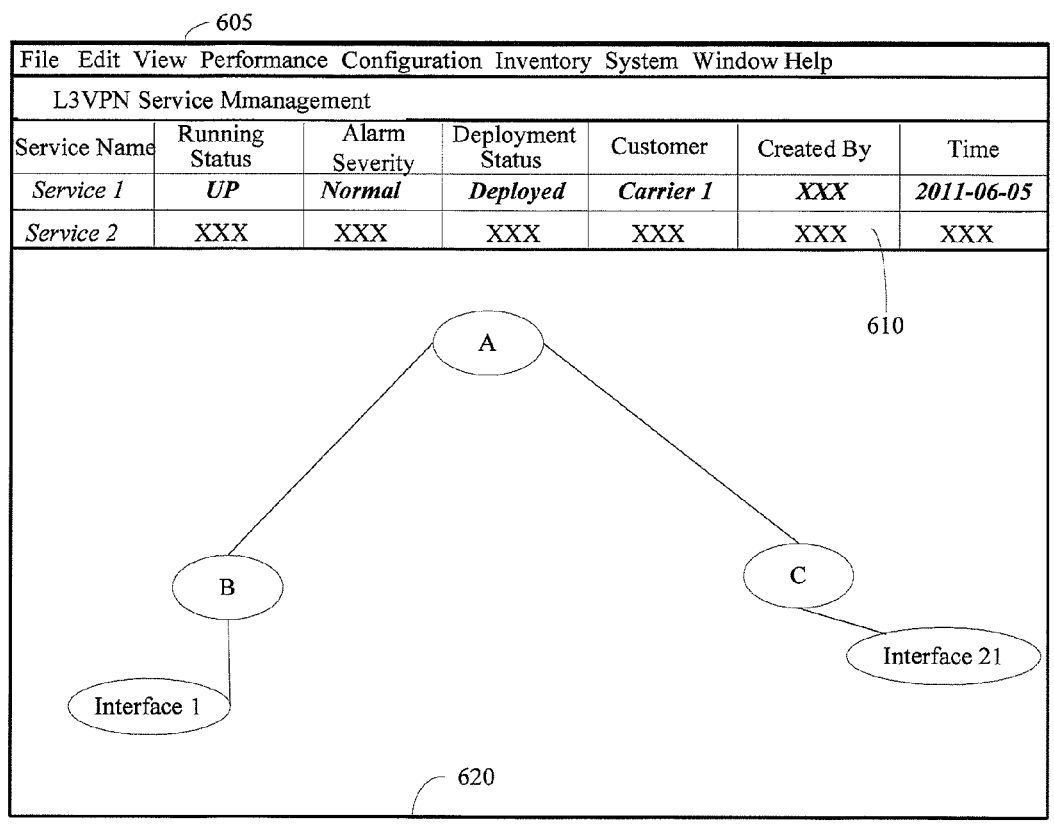

The current user's operations of viewing layers of paths include: viewing a VPN path, redirecting to view a tunnel path, and separately viewing each segmented LSP path in the tunnel path. FIG. 6A to FIG. 6C illustrate related methods for presenting a network path by using an example that a path of an L3VPN service is viewed.

FIG. 6A presents an interface displayed after a "service 1" parameter in a specified L3VPN is selected, including a VPN service list 610, a first topology view 620, and a menu option 605. Herein, the bold italic type is used for highlighted display.

A VPN service path between a network element A and a network element B is selected in the first topology view 620, a menu is displayed by right-clicking, a "View Tunnel" option is selected, and subsequently the interface shown in FIG. 6B is presented.

FIG. 6B includes a service management list 630 and the menu option 605. The service management list 630 includes two parameters: a "Tunnel 1" parameter 631 (indicating a forward tunnel link) and a "Tunnel 1-reverse" parameter 635 (indicating a reverse tunnel link).

The interface shown in FIG. 6C is presented by selecting the "Tunnel 1" parameter 631 in the service management list 630.

FIG. 6C includes the service management list 630, a tunnel forward topology view 640, and an LSP link list 650. If the "Tunnel 1-reverse" parameter 635 is selected in the service management list 630, a tunnel reverse topology view is correspondingly presented, which is not repeatedly described herein.

Subsequently, a forward LSP link of the tunnel 1 can be viewed segment by segment only by selecting parameters in the LSP link list 650 one by one. After an "LSP link 1" parameter 651 is selected, FIG. 6D presents an LSP link topology view 660.

In the foregoing method, the user needs to understand an association relationship between a VPN service link, a tunnel link, and an LSP link, and manually record the relationship between the three links during a searching process, which is inefficient. An embodiment of the present invention provides a method for presenting a network path, which can improve the working efficiency in the foregoing method.

Figure 1:
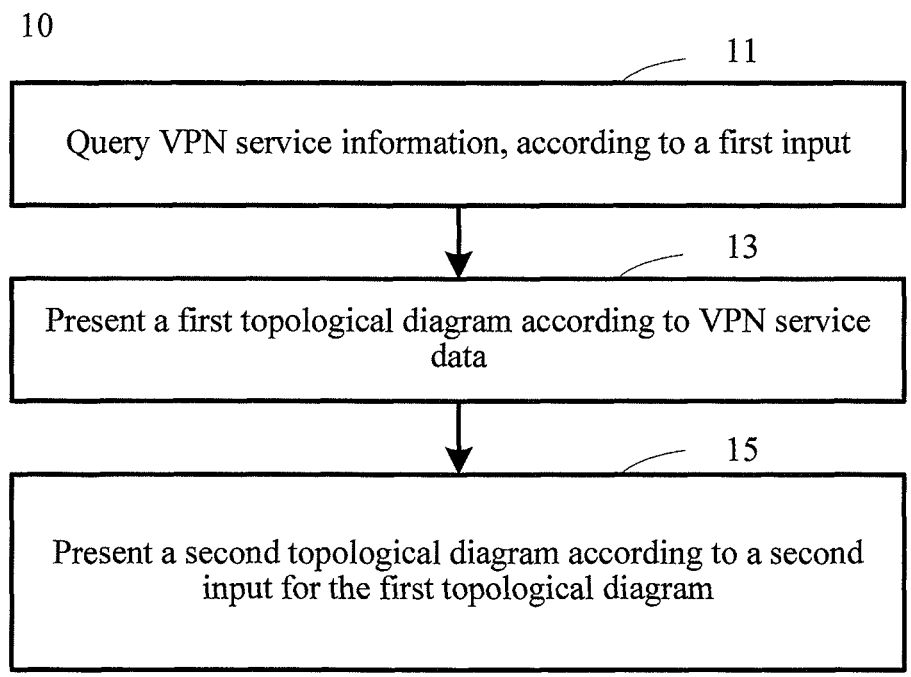
FIG. 1 is a flowchart of a method for presenting a network path according to an embodiment of the present invention.

FIG. 1 is a flowchart of a method 10 for presenting a network path according to an embodiment of the present invention.

11. Query, according to a first input, VPN service data corresponding to VPN service information selected by the first input, where the first input is used for selecting the VPN (Virtual Private Network, virtual private network) service information.

13. Present a first topology view according to the VPN service data, where the first topology view presents a service connection relationship between network elements.

15. Present a second topology view according to a second input for the first topology view, where the presented second topology view includes a plurality of different topology layers presenting connection relationships between the network elements.

According to this embodiment of the present invention, a plurality of connection relationships of a network path may be presented in a topology view, so that a complex activity of a user's manual query is simplified, and a skill requirement imposed on the user is lowered. In this way, the user does not need to memorize association relationships of services. In addition, during viewing of the associated paths of the services, relationships between layers of paths of the services can be clearly presented in one interface. This facilitates fault locating by the user, thereby improving the working efficiency of the user.

Figure 2:
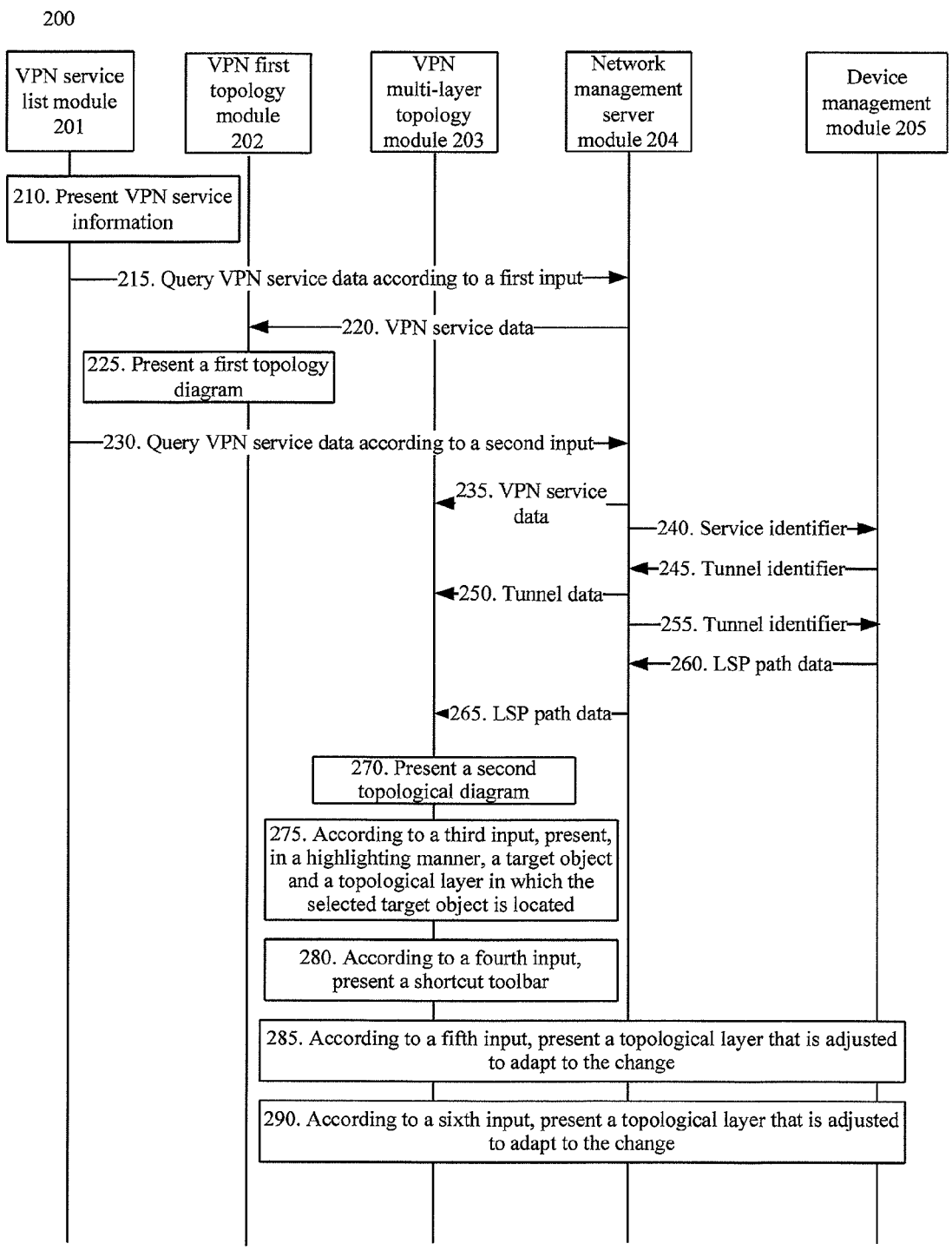
FIG. 2 is a flowchart of a method for presenting a network path according to another embodiment of the present invention.

FIG. 2 is a diagram of interaction of a method 200 for presenting a network path according to another embodiment of the present invention.

The method 200 may be implemented by a network management apparatus. The network management apparatus includes a VPN service list module 201, a VPN first topology module 202, a VPN multi-layer topology module 203, a network management server module 204, and a device management module 205. The following describes interaction processes between these modules in detail.

210. First, the VPN service list module 201 presents VPN service information in a list form, where the list is shown in 610 of FIG. 6.

215. The VPN service list module 201 queries, from the network management server module 204 according to a first input, VPN service data corresponding to the VPN service information selected by the first input.

The first input may be the VPN service information selected by a user by using a mouse.

220. The network management server module 204 sends the queried VPN service data to the VPN first topology module 202.

225. The VPN first topology module 202 presents a first topology view according to the VPN service data, where the first topology view presents a service connection relationship between network elements. The first topology view is shown in 620 of FIG. 6A.

230. The VPN service list module 201 queries, from the network management server module 204, the VPN service data according to a second input for the first topology view.

The second input used for presenting a second topology view may be received by selecting, by the user, the first topology view and clicking an option in a drop-down menu that is displayed by right-clicking, for example, selecting an option named service path.

235. The network management server module 204 sends the queried VPN service data to the VPN multi-layer topology module 203.

240. The network management server module 204 sends a service identifier corresponding to the acquired VPN service data to the device management module 205.

245. The device management module 205 feeds back a tunnel (tunnel) identifier corresponding to the service identifier to the network management server module 204.

250. The network management server module 204 sends the fed-back tunnel data to the VPN multi-layer topology module 203.

255. The network management server module 204 sends the tunnel identifier to the device management module 205.

260. The device management module 205 sends LSP path data corresponding to the tunnel identifier to the network management server module 204.

265. The network management server module 204 sends the fed-back LSP path data to the VPN multi-layer topology module 203.

Figure 3A:
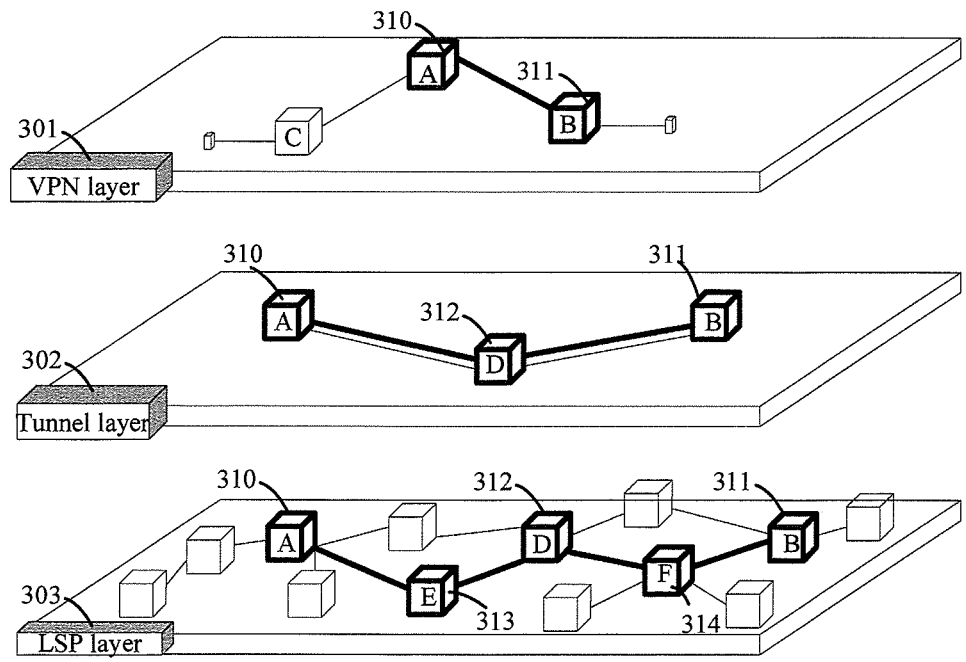
FIG. 3A to FIG. 3E are schematic diagrams of a method for presenting a network path according to an embodiment of the present invention.

270. The VPN multi-layer topology module 203 presents the second topology view according to the VPN service data, the tunnel data, and the LSP path data, as shown in FIG. 3A.

The second topology view includes a plurality of different topology layers presenting connection relationships between the network elements. The presented second topology view includes the plurality of different topology layers that are three-dimensionally presented and used for presenting the connection relationships between the network elements. In this embodiment of the present invention, the three-dimensional presentation manner in an interface is more visual than the presentation of a plurality of connection relationships within a plane, which further facilitates fault locating by the user.

The plurality of topology layers include a first topology layer (a VPN layer) corresponding to the VPN service data, a second topology layer (a tunnel layer) corresponding to the tunnel data, and a third topology layer (an LSP layer) corresponding to the LSP path data respectively. The first topology layer is generated according to the VPN service data, and the first topology layer is used for presenting a service connection relationship between the network elements 310 and 311. The second topology layer is generated according to the tunnel data, and the second topology layer is used for presenting a tunnel connection relationship between the network elements 310 and 311. The third topology layer is generated according to the LSP path data, and the third topology layer is used for presenting an LSP connection relationship between the network elements 310 and 311. The first topology layer is shown in 301 of FIG. 3. The second topology layer is shown in 302 of FIG. 3, where the network element 310 is connected to the network element 311 by using a network element 312. The third topology layer is shown in 303 of FIG. 3, where the network element 310 is connected to the network element 311 by using network elements 313, 312, and 314.

In this way, paths at the tunnel layer and the LSP layer are automatically associated according to top layer service information. Accordingly, the user may not have basic knowledge about IP layering, and does not need to manually establish the association relationship and manually query service data. In addition, the third topology layer completely presents a physical path instead of displaying the physical path segment by segment, which greatly facilitates the user's clear understanding of the network.

Figure 3B:
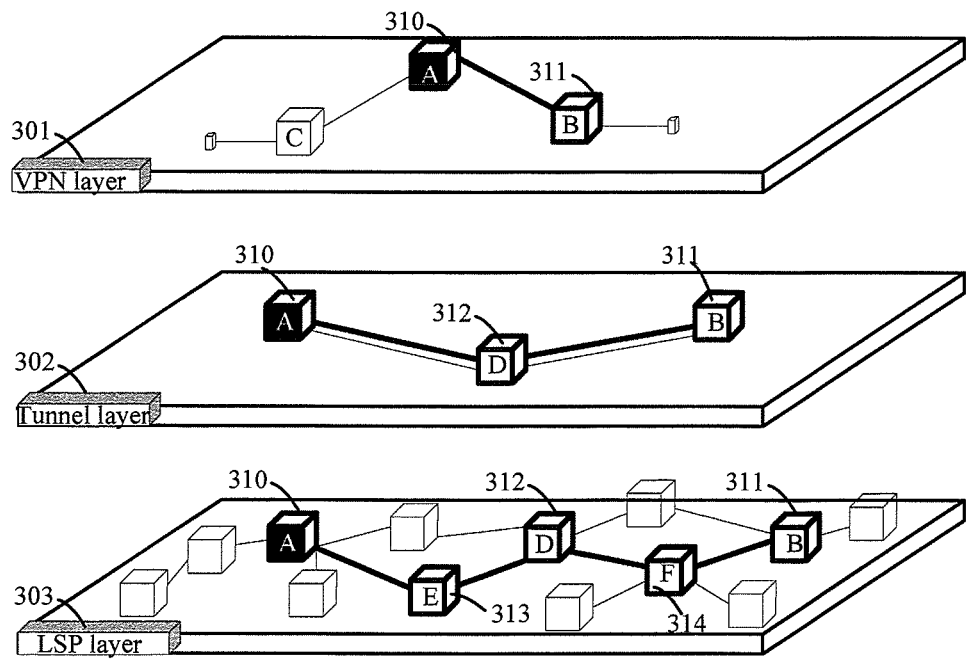
Figure 3C:
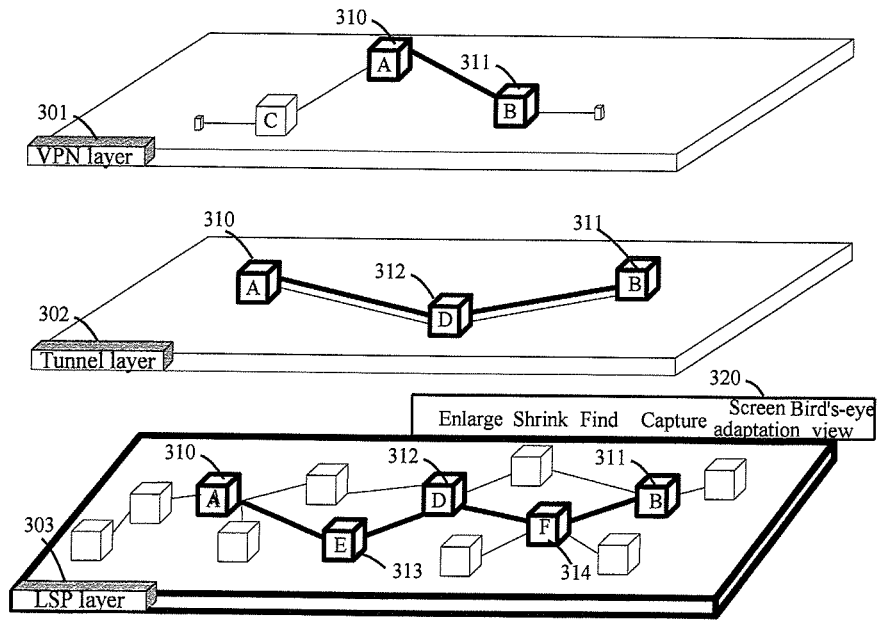

275. According to a third input, the VPN multi-layer topology module 203 presents, in a highlighting manner, a target object selected at the topology layers and a topology layer in which the selected target object is located. As shown in FIG. 3B, the network element 310 is presented in a highlighting manner by means of boldface.

Although highlighted display is implemented by means of boldface in the drawings of the embodiments of the present invention, highlighted display may also be implemented in other manners. For example, highlighted display is implemented by changing the line widths of the selected target object and the topology layer in which the selected target object is located, setting the lines to solid lines or dashed lines, and setting whether the lines flicker. In addition, the view angle of the topology layer in which the target object is located may also be adjusted so that the user views and adjusts the target object at the topology layer, as shown in 303 of FIG. 3C.

280. According to a fourth input, the VPN multi-layer topology module 203 is used for presenting, next to the selected topology layer, a shortcut toolbar for adjusting the topology layer, as shown in 320 of FIG. 3C.

The shortcut toolbar may include options for adjusting the topology layer, such as zoom in, zoom out, find, capture, fit to screen, and bird's-eye view topology layer.

285. When changing, according to a fifth input, the target object selected at the first topology layer, the VPN multi-layer topology module 203 presents a topology layer that is adjusted to adapt to the change, as shown in FIG. 3D.

Figure 3D:
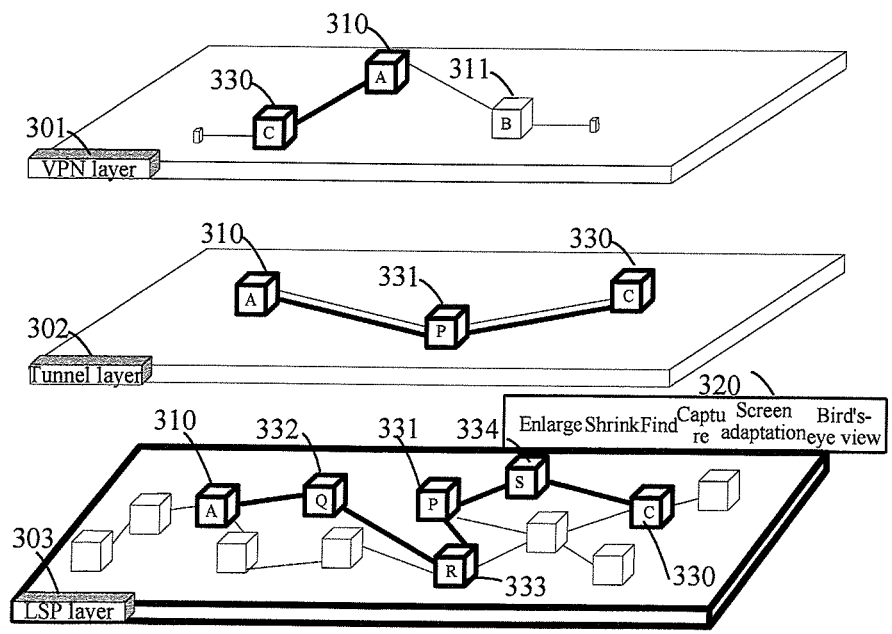

For example, if the service information between the network elements 310 and 311, which is originally selected by the user is changed into the service information between the network elements 310 and 330, as shown in the first topology layer 301 of FIG. 3D, the second topology layer 302 and the third topology layer 303 are accordingly adjusted separately according to the tunnel data and the LSP path data re-queried by the network management server module 204 and the device management module 205. As shown in 302 of FIG. 3D, the network element 310 is connected to the network element 330 by using the network element 331. As shown in 303 of FIG. 3D, the network element 310 is connected to the network element 330 by using network elements 332, 333, 331, and 334.

290. When changing, according to a sixth input, the target object selected at the second topology layer, the VPN multi-layer topology module 203 presents a topology layer that is adjusted to adapt to the change, as shown in FIG. 3E.

Figure 3E:
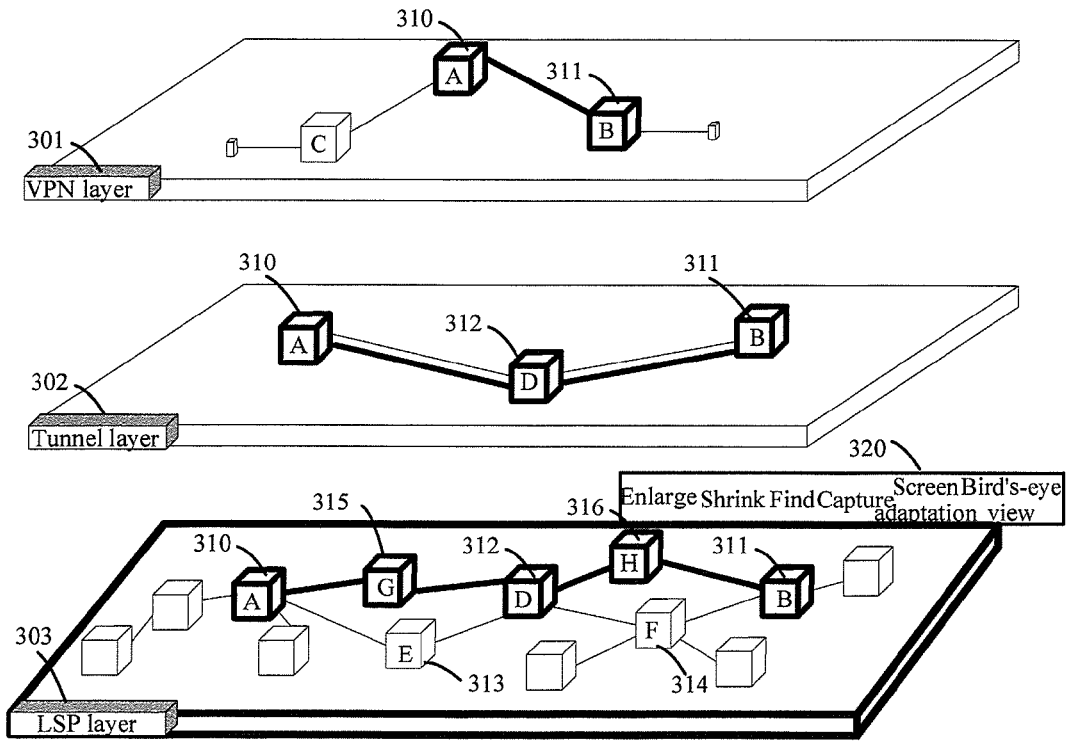

For example, the user originally views a forward tunnel, as shown in the second topology layer 302 of FIG. 3B, and in this case, the forward tunnel is changed into a reverse tunnel, as shown in the second topology layer 302 of FIG. 3E. The path at the LSP layer needs to be re-queried by using the network management server module 204 and the device management module 205, and presented at the third topology layer 303. As shown in FIG. 3E, the network element 311 is connected to the network element 310 by using network elements 316, 312, and 315.

According to this embodiment of the present invention, a plurality of connection relationships of a network path may be presented in a topology view, so that a complex activity of a user's manual query is simplified, and a skill requirement imposed on the user is lowered. In this way, the user does not need to memorize association relationships of services. In addition, during viewing of the associated paths of the services, relationships between layers of paths of the services can be clearly presented in one interface. This facilitates fault locating by the user, thereby improving the working efficiency of the user.

Figure 4:
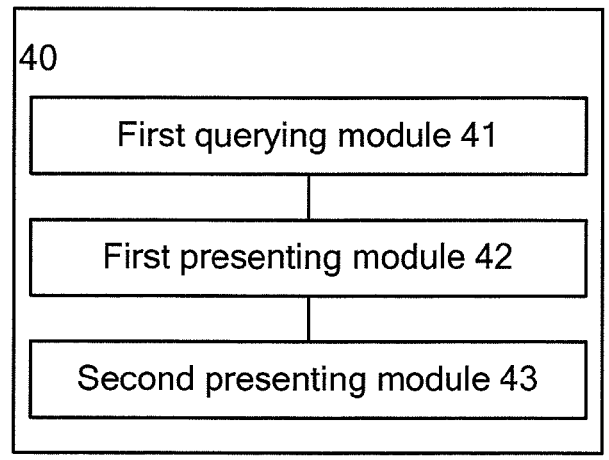
FIG. 4 is a block diagram of an apparatus for presenting a network path according to an embodiment of the present invention.

FIG. 4 is a block diagram of an apparatus 40 for presenting a network path according to an embodiment of the present invention.

The apparatus 40 includes a first querying module 41, a first presenting module 42, and a second presenting module 43.

The first querying module 41 queries, according to a first input, VPN service data corresponding to VPN service information selected by the first input, where the first input is used for selecting the VPN (Visual Private Network, virtual private network) service information.

The first presenting module 42 presents a first topology view according to the VPN service data queried by the first querying module 41, where the first topology view presents a service connection relationship between network elements.

The second presenting module 43 presents a second topology view according to a second input for the first topology view presented by the first presenting module 42, where the second input is used for presenting the second topology view and the presented second topology view includes a plurality of different topology layers presenting connection relationships between the network elements.

The apparatus 40 implements the method 10. The details are not repeatedly described herein.

According to this embodiment of the present invention, a plurality of connection relationships of a network path may be presented in a topology view, so that a complex activity of a user's manual query is simplified, and a skill requirement imposed on the user is lowered. In this way, the user does not need to memorize association relationships of services. In addition, during viewing of the associated paths of the services, relationships between layers of paths of the services can be clearly presented in one interface.

This facilitates fault locating by the user, thereby improving the working efficiency of the user.

Figure 5:
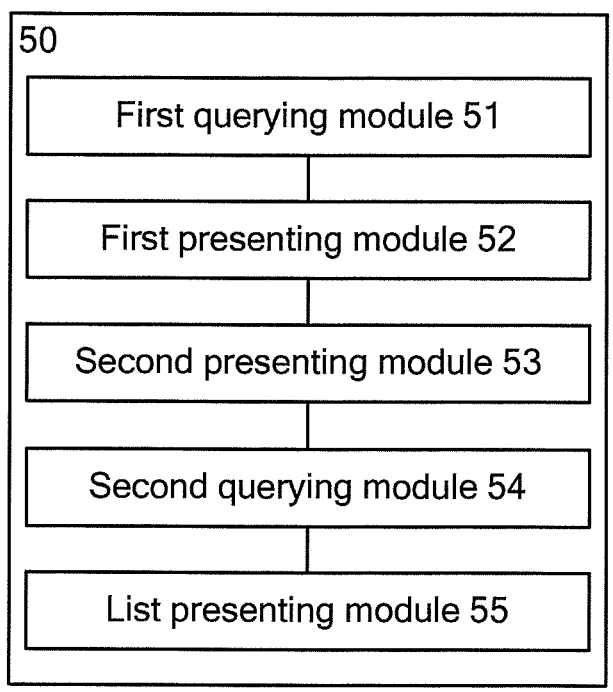
FIG. 5 is a block diagram of another apparatus for presenting a network path according to an embodiment of the present invention.

FIG. 5 is a block diagram of another apparatus 50 for presenting a network path according to an embodiment of the present invention.

The apparatus 50 includes a first querying module 51, a first presenting module 52, and a second presenting module 53, which are the same as or similar to the first querying module 41, the first presenting module 42, and the second presenting 43 of the apparatus 40.

The first querying module 51 queries, according to a first input, VPN service data corresponding to VPN service information selected by the first input, where the first input is used for selecting the VPN (Visual Private Network, virtual private network) service information.

The first presenting module 52 presents a first topology view according to the VPN service data queried by the first querying module 51, where the first topology view presents a service connection relationship between network elements.

The second presenting module 53 presents a second topology view according to a second input for the first topology view presented by the first presenting module 52, where the second input is used for presenting the second topology view and the presented second topology view includes a plurality of different topology layers presenting connection relationships between the network elements. The presented second topology view may include the plurality of different topology layers that are three-dimensionally presented and used for presenting the connection relationships between the network elements. In this embodiment of the present invention, the three-dimensional presentation manner in an interface is more visual than the presentation of a plurality of connection relationships within a plane, which further facilitates fault locating by a user.

Different from the apparatus 40, the apparatus 50 further includes a second querying module 54 and a list presenting module 55.

The second querying module 54 separately acquires the VPN service data, a tunnel data, and a LSP path data according to the second input for the first topology view presented by the first presenting module 52, and sends the queried data to the second presenting module 53.

The presenting, by a second presenting module, a second topology view, where the second topology view includes a plurality of different topology layers presenting connection relationships between the network elements, specifically includes:

generating, by the second presenting module and according to the VPN service data, the first topology layer used for presenting the service connection relationship between the network elements;

generating, by the second presenting module and according to the tunnel data, the second topology layer used for presenting the Tunnel connection relationship between the network elements; and generating, by the second presenting module and according to the LSP path data, the third topology layer used for presenting the LSP connection relationship between the network elements.

The list presenting module 55 presents the VPN service information in a list form.

The network management apparatus in the method 200 may serve as an implementation manner for the apparatus 50. The network management server module 204 and the device management module 205 may implement the second querying module 54. The VPN service list module 201 may implement the list presenting module 55 and the first querying module 51. The VPN first topological module 202 may implement the first presenting module 52. The VPN multi-layer topology module 203 may implement the second presenting module 53.

The apparatus 50 implements the methods 10 and 200. The details are not repeatedly described herein.

According to this embodiment of the present invention, a plurality of connection relationships of a network path may be presented in a topology view, so that a complex activity of a user's manual query is simplified, and a skill requirement imposed on the user is lowered. In this way, the user does not need to memorize association relationships of services. In addition, during viewing of the associated paths of the services, relationships between layers of paths of the services can be clearly presented in one interface. This facilitates fault locating by the user, thereby improving the working efficiency of the user.

The plurality of topology layers presented by the second presenting module 53 include a first topology layer corresponding to the VPN service data, a second topology layer corresponding to the tunnel data, and a third topology layer corresponding to the LSP path data. The first topology layer is used for presenting a service connection relationship between the network elements; the second topology layer is used for presenting a Tunnel connection relationship between the network elements; and the third topology layer is used for presenting an LSP connection relationship between the network elements.

In addition, the second presenting module 53 may further present, in a highlighting manner and according to a third input, a target object selected at the topology layers, and a topology layer in which the selected target object is located.

The second presenting module 53 may further present, next to the selected topology layer and according to a fourth input, a shortcut toolbar for adjusting the topology layer.

The second presenting module 53 may further present, when changing, according to a fifth input, the target object selected at the first topology layer, a topology layer that is adjusted to adapt to the change.

The second presenting module 53 may further present, when changing, according to a sixth input, the target object selected at the second topology layer, a topology layer that is adjusted to adapt to the change.

According to this embodiment of the present invention, a plurality of connection relationships of a network path may be presented in a topology view, so that a complex activity of a user's manual query is simplified, and a skill requirement imposed on the user is lowered. In this way, the user does not need to memorize association relationships of services. In addition, during viewing of the associated paths of the services, relationships between layers of paths of the services can be clearly presented in one interface. This facilitates fault locating by the user, thereby improving the working efficiency of the user.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of the present invention essentially, or the part contributing to the prior art, or a part of the technical solutions may be implemented in a form of a software product. The software product is stored in a storage medium, and includes several instructions for instructing a computer device (which may be a personal computer, a server, or a network device) to perform all or a part of the steps of the methods described in the embodiments of the present invention. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for presenting a network path, the method comprising:
   querying, according to a first input, virtual private network (VPN) service data corresponding to VPN service information selected by the first input, wherein the first input is used for selecting the VPN service information;
   presenting a first topology view according to the VPN service data, wherein the first topology view presents a service connection relationship between network elements; and
   presenting a second topology view according to a second input for the first topology view, wherein the presented second topology view comprises a plurality of different topology layers presenting connection relationships between the network elements.

2. The method according to claim 1, wherein the plurality of topology layers comprised in the second topology view comprises:
   a first topology layer corresponding to the VPN service data, a second topology layer corresponding to tunnel data, and a third topology layer corresponding to label switched (LSP) path data; and
   wherein the first topology layer is used for presenting the service connection relationship between the network elements, the second topology layer is used for presenting a tunnel connection relationship between the network elements, and the third topology layer is used for presenting an LSP connection relationship between the network elements.

3. The method according to claim 2, wherein before presenting a second topology view, the method further comprises:
   separately acquiring the VPN service data, the tunnel data, and the LSP path data according to the second input; and
   correspondingly, presenting a second topology view, wherein the second topology view comprises a plurality of different topology layers presenting connection relationships between the network elements, comprises:
   generating, according to the VPN service data, the first topology layer used for presenting the service connection relationship between the network elements,
   generating, according to the tunnel data, the second topology layer used for presenting the tunnel connection relationship between the network elements, and
   generating, according to the LSP path data, the third topology layer used for presenting the LSP connection relationship between the network elements.

4. The method according to claim 1, wherein before querying, according to a first input, VPN service data corresponding to VPN service information selected by the first input, the method further comprises:
   presenting the VPN service information in a list form.

5. The method according to claim 1, wherein the method further comprises:
   presenting, in a highlighting manner and according to a third input, a target object selected at the topology layers, and a topology layer in which the selected target object is located.

6. The method according to claim 1, wherein the method further comprises:
   presenting, next to the selected topology layer and according to a fourth input, a shortcut toolbar for adjusting the topology layer.

7. The method according to claim 2, wherein the method further comprises:
   when changing, according to a fifth input, the target object selected at the first topology layer, presenting a topology layer that is adjusted to adapt to the change; or
   when changing, according to a sixth input, the target object selected at the second topology layer, presenting a topology layer that is adjusted to adapt to the change.

8. The method according to claim 1, wherein the presented second topology view comprises the plurality of different topology layers that are three-dimensionally presented and used for presenting the connection relationships between the network elements.

9. An apparatus for presenting a network path, the apparatus comprising:
   a first querying module, configured to query, according to a first input, virtual private network (VPN) service data corresponding to VPN service information selected by the first input, wherein the first input is used for selecting the VPN service information;
   a first presenting module, configured to present a first topology view according to the VPN service data acquired by the first querying module, wherein the first topology view presents a service connection relationship between network elements; and a second presenting module, configured to present a second topology view according to a second input for the first topology view presented by the first presenting module, wherein the second input is used for presenting the second topology view and the presented second topology view comprises a plurality of different topology layers presenting connection relationships between the network elements.

10. The apparatus according to claim 9, wherein the plurality of topology layers comprised in the second topology view presented by the second presenting module separately comprise:

a first topology layer corresponding to the VPN service data, a second topology layer corresponding to tunnel data, and a third topology layer corresponding to label switched (LSP) path data; and wherein the first topology layer is used for presenting the service connection relationship between the network elements, the second topology layer is used for presenting a tunnel connection relationship between the network elements, and the third topology layer is used for presenting an LSP connection relationship between the network elements.

11. The apparatus according to claim 10, wherein the apparatus further comprises:

a second querying module, configured to separately acquire the VPN service data, the tunnel data, and the LSP path data according to the second input, and send the acquired data to the second presenting module; and the second presenting module, is further configured to:

generate, by the second presenting module according to the VPN service data, the first topology layer used for presenting the service connection relationship between the network elements, generate, by the second presenting module according to the tunnel data, the second topology layer used for presenting the Tunnel connection relationship between the network elements, and generate, by the second presenting module according to the LSP path data, the third topology layer used for presenting the LSP connection relationship between the network elements.

12. The apparatus according to claim 9, wherein the apparatus further comprises:

a list presenting module, configured to present the VPN service information in a list form.

13. The apparatus according to claim 9, wherein:

the second presenting module is further configured to present, in a highlighting manner and according to a third input, a target object selected at the topology layers, and a topology layer in which the selected target object is located.

14. The apparatus according to claim 9, wherein:

the second presenting module is further configured to present, next to the selected topology layer and according to a fourth input, a shortcut toolbar for adjusting the topology layer.

15. The apparatus according to claim 10, wherein:

the second presenting module is further configured to:
when changing, according to a fifth input, the target object selected at the first topology layer, present a topology layer that is adjusted to adapt to the change; or
when changing, according to a sixth input, the target object selected at the second topology layer, present a topology layer that is adjusted to adapt to the change.

16. The apparatus according to claim 9, wherein the second topology view presented by the second presenting module comprises the plurality of different topology layers that are three-dimensionally presented and used for presenting the connection relationships between the network elements.

* * * * *